United States Patent [19]
Stockton et al.

[11] Patent Number: 5,546,693
[45] Date of Patent: Aug. 20, 1996

[54] HINGED FISHING ROD HOLDER

[76] Inventors: Stanley C. Stockton; Mary J. Stockton, both of 3234 Geona St., Cocoa, Fla. 32926

[21] Appl. No.: 505,074

[22] Filed: Jul. 21, 1995

[51] Int. Cl.⁶ ................................................ A01K 97/10
[52] U.S. Cl. ......................... 43/21.2; 248/514; 248/530
[58] Field of Search .......................... 43/21.2; 248/530, 248/514, 515, 517, 520, 538

[56] References Cited

U.S. PATENT DOCUMENTS

| | | |
|---|---|---|
| 176,905 | 5/1876 | Welton ............................ 248/514 |
| D. 295,776 | 5/1988 | Johansen . |
| 419,137 | 1/1890 | Bobemeritl ...................... 248/515 |
| 2,360,402 | 10/1944 | Determan ........................ 43/21.2 |
| 2,441,109 | 5/1948 | Carlson ........................... 248/514 |
| 2,706,608 | 4/1955 | Joseph ............................. 248/514 |
| 3,000,599 | 9/1961 | Honig .............................. 248/515 |
| 3,212,740 | 10/1965 | Greenberg ....................... 248/514 |
| 3,290,816 | 12/1966 | Eklof ............................... 43/21.2 |
| 4,650,146 | 3/1987 | Duke . |
| 4,677,784 | 7/1987 | Butkus ............................. 43/21.2 |
| 4,848,021 | 7/1989 | Simko . |
| 4,852,291 | 8/1989 | Mengo ............................. 43/21.2 |
| 5,054,228 | 10/1991 | Elkins . |
| 5,184,797 | 2/1993 | Hurner . |
| 5,245,778 | 9/1993 | Gallegos . |
| 5,349,775 | 9/1994 | Mondares . |

Primary Examiner—Joseph J. Hail, III
Assistant Examiner—James Miner
Attorney, Agent, or Firm—Richard C. Litman

[57] ABSTRACT

A hinged fishing rod holder allows the base portion to be fixed in the sand or ground, with the opposite rod holder portion being hinged or pivoted to the base portion. The two portions are formed of tubular material, and are concentric with one another when extended to position the fishing rod in a fishing position, with the hinge assembly having a stop to prevent relative motion beyond the aligned position in a forward direction. When a fish is hooked, the angler may grasp the rod and pull it rearwardly to set the hook, and also to pivot the rod holder portion rearwardly to an essentially vertical intermediate position, where a predetermined interference in the hinge holds the rod holder and rod vertically. With the rod holder and rod in this position, a fish may be reeled in and easily removed from the line, and the hook rebaited as required. The rod holder portion may then be pivoted further rearwardly with the application of some pressure to pass the hinge interference point to arrive at the rearward stop, whereupon the rod may be removed easily to cast. The present fishing rod holder is particularly convenient for the physically handicapped and/or persons confined to a wheelchair or the like.

10 Claims, 4 Drawing Sheets

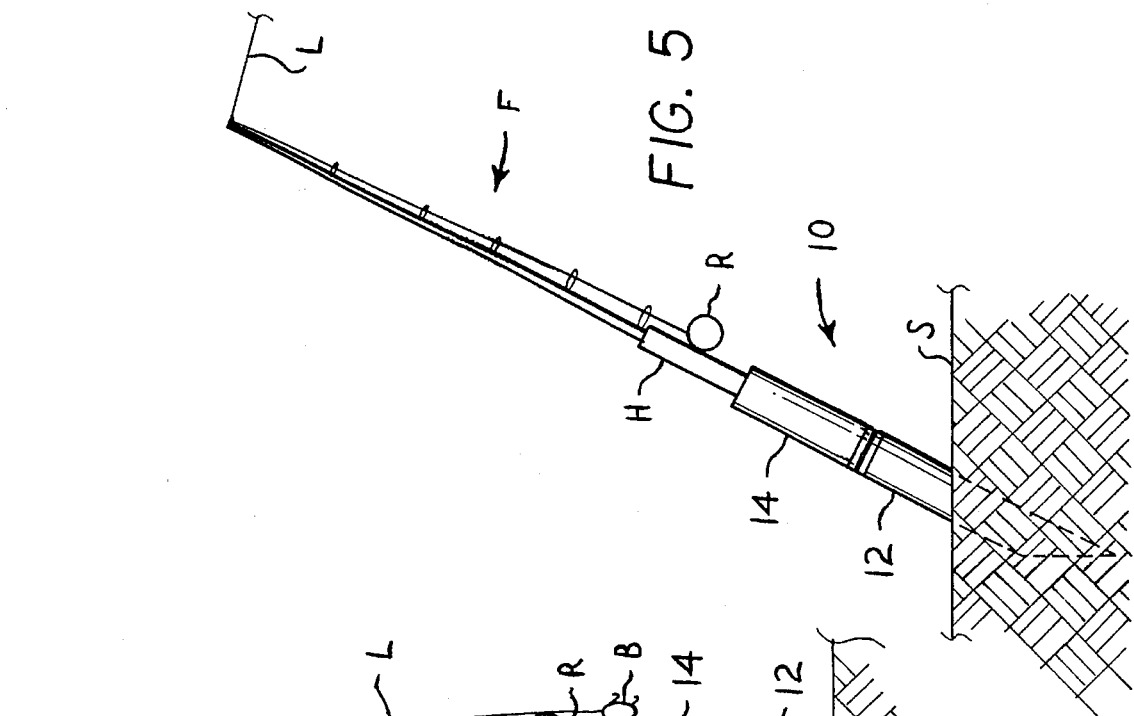
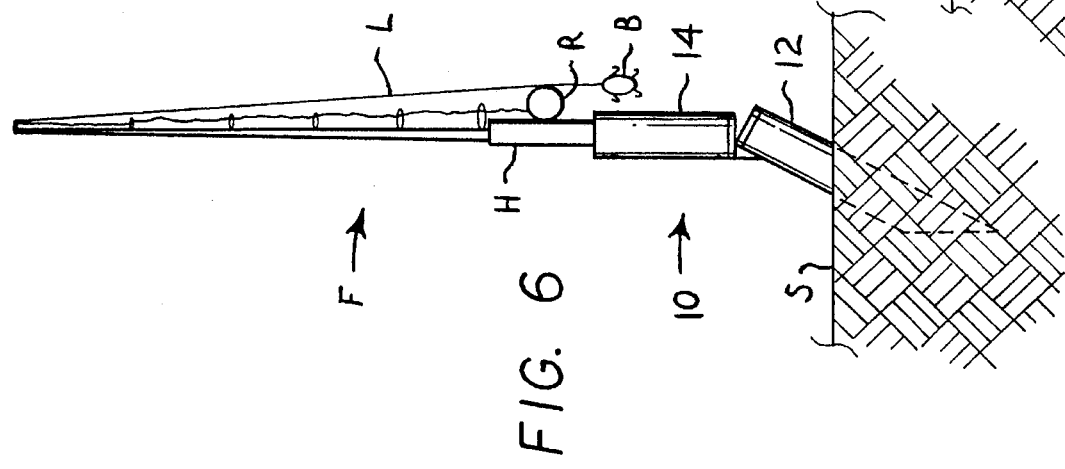
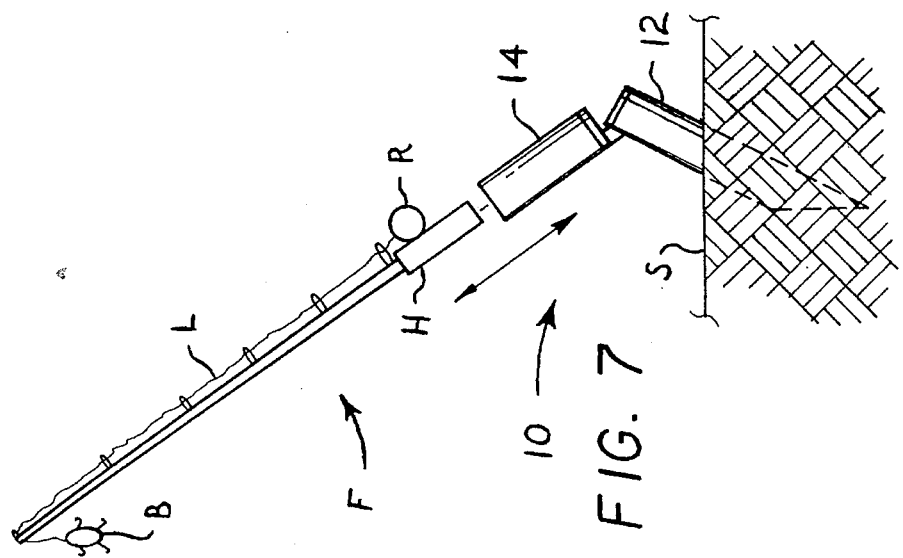

HINGED FISHING ROD HOLDER

FIELD OF THE INVENTION

The present invention relates generally to devices providing for the holding or retaining of another article therein, and more specifically to a generally tubular fishing rod holder having a base portion with an upper fishing rod retaining portion hinged thereto. The upper portion arcuately folds between an extended position and a folded position with stops at each extreme, and includes an interference within the hinge portion to frictionally retain the upper portion at an intermediate position relative to the lower portion, if desired.

BACKGROUND OF THE INVENTION

Fishing is an enjoyable pastime for many persons, due to the relaxing nature of the sport, as well as other reasons. Depending upon the specific type of fishing, there may be little activity required between casts and the actual catching of a fish, with nothing more required than the monitoring of the rod and line to determine if a fish is caught. Accordingly, many persons who may have physical handicaps which limit or preclude their engaging in other outdoor activities, can enjoy the sport of fishing.

While the holding of the fishing rod does not require any great strength or skill, it can become tedious over a period of time, and moreover, may preclude other activities (eating and drinking, reading, etc.). Accordingly, numerous fishing rod holders have been developed in the past. Most such devices essentially comprise a tube, into which the butt or handle of the rod may be inserted. The tube is then positioned at an angle to the horizontal and vertical, to hold the fishing rod properly.

Such a fishing rod holder at least frees the hands of the angler, but still requires him/her to remove the rod from the holder to retrieve a fish, rebait the hook, etc. Due to the required forward angle of the rod toward the water, the rod must be lifted upwardly and forwardly, generally away from the seated angler, for withdrawal. The operation is cumbersome, particularly for a person who may be confined to a wheelchair or otherwise is limited physically.

Accordingly, a need will be seen for a hinged or articulated fishing rod holder, which comprises a base portion and a rod holder portion hingedly attached thereto. The hinge mechanism comprises first and second plug members which are hinged together, and which may be inserted into tubular extensions comprising the base portion and rod holder portion. The hinge mechanism includes stop means with one limit providing for the concentric alignment of the base and rod holder portions, and the other limit providing a maximum angle between the two portions. In addition, the hinge mechanism includes an intermediate interference area, serving to frictionally hold the two components at an approximate intermediate position between the two limits or stops. Thus, the angler may seat the base portion in the sand or ground at an appropriate angle, draw the rod back to an intermediate vertical position to set the hook and reel the fish in when a fish is caught, and draw the rod back further to a rearwardly angled position for ease of withdrawal of the rod from the holder in order to rebait the hook or make another cast, as desired, with the rod holder portion being repositioned forwardly to hold the rod in the fishing position. The base portion may be adapted for insertion into an oar lock passage or the like in the gunwale of a boat, if desired.

DESCRIPTION OF THE PRIOR ART

U.S. Pat. No. 4,650,146 issued to Ned E. Duke on Mar. 17, 1987 describes a Surf Fishing Rod Holder comprising a central base or anchor member with two tubular rod holders adjustably attached laterally thereto. The rod holder portion(s) is/are not concentric with the base portion, and no means is provided for angularly adjusting the rod holder portion by a single hinge mechanism therebetween, as in the present rod holder.

U.S. Pat. No. 4,848,021 issued to Bryant Simko on Jul. 18, 1989 describes a Fishing Rod Holder adapted to be fastened to another article (e.g., a tackle box). The device has a generally box-like configuration, with no adjustment of any sort provided.

U.S. Pat. No. 5,054,228 issued to Jack D. Elkins on Oct. 8, 1991 describes a Polecat Fishing Pole Holder generally comprising a relatively heavy box structure, with the upper portion including a plurality of sockets therein each adapted to hold the butt of a fishing rod. The mass of the structure, in addition to a relatively massive base, serve to anchor the fishing rods to preclude upset or displacement, even though the rod holder itself may not be anchored. No means is provided for angularly adjusting the pole(s) placed therein, as with the present rod holder.

U.S. Pat. No. 5,184,797 issued to Erwin E. Hurner on Feb. 9, 1993 describes a Fishing Rod Holder including a base portion and a rod holder portion attached thereto. The base portion is adapted to fit within an oar lock receptacle or the like on a boat. While the present invention may include a base portion adapter for such purpose, the Hurner rod holder portion is not hinged to the base portion, as in the present invention, but rather is adjustably clamped thereto.

U.S. Pat. No. 5,245,778 issued to Robert W. Gallegos et al. on Sep. 21, 1993 describes a Fishing Pole Holder And Hook Device including an automatic hook setting mechanism. The rod is held essentially perpendicularly to the base portion, unlike the present rod holder, and the fishing line is routed from the reel to a trip device which causes the rod holder portion to tip upwardly automatically when tension is applied to the line, as when a fish strikes. The device is limited to two operable positions, and no frictional engagement of an intermediate position is disclosed, as provided by the present fishing rod holder.

U.S. Pat. No. 5,349,775 issued to Valentino G. Mondares on Sep. 27, 1994 describes an Adjustable Ground-Inserted Fishing Rod Holder generally comprising an L section stake which is driven into the ground or sand. The stake includes two collars slidable thereon, adapted to hold a fishing rod therein. No hinge means or arcuate movement of one end relative to the other, is provided.

Finally, U.S. Pat. No. D-295,776 issued to Kay R. Johansen on May 17, 1988 describes a design for a Multiple Position Fishing Pole Holder which resembles a belt attached flag carrier or holder. The device includes an upstanding plate which is attached to a belt like portion, with a tubular member secured to the plate. The tubular member may apparently be arcuately moved to the left or right to a limited degree, relative to the plate. However, no lower anchor member, concentricity between lower and upper members, or intermediate frictionally retained position of members, appears to be disclosed by the Johansen design.

None of the above noted patents, taken either singly or in combination, are seen to disclose the specific arrangement of concepts disclosed by the present invention.

SUMMARY OF THE INVENTION

By the present invention, an improved fishing rod holder is disclosed.

Accordingly, one of the objects of the present invention is to provide an improved fishing rod holder which includes a tubular base portion and a tubular rod holder portion hingedly connected together, and concentric with one another when aligned.

Another of the objects of the present invention is to provide an improved fishing rod holder which hinge portion comprises a first plug and an opposite second plug having a hinge plate of stainless steel or other suitable material connected therebetween, with the hinge plate immovably connected to one plug and pivotally connected to the other plug to allow relative pivotal movement therebetween.

Yet another of the objects of the present invention is to provide an improved fishing rod holder which includes opposite first and second stop means within the hinge portion, with the stop means limiting movement of the base portion and rod holder portion between an aligned position and a predetermined angularly offset position.

Still another of the objects of the present invention is to provide an improved fishing rod holder which hinge portion further includes a predetermined amount of interference between the first and second plugs at an intermediate position, thereby serving to hold the base portion and rod holder portion at an intermediate position relative to one another as desired.

A further object of the present invention is to provide an improved fishing rod holder which hinge portion plugs may be frictionally held within the ends of their respective tubular base and rod holder portions, or alternatively which may be threaded into their respective portions.

An additional object of the present invention is to provide an improved fishing rod holder which base and rod holder portions may be formed of polyvinyl chloride or other plastic material, or alternatively may be formed of aluminum or other metal, as desired, and which first and second plugs may be formed of Nylon (tm) or other plastic material, or alternatively which may be formed of aluminum or other metal.

A final object of the present invention is to provide an improved fishing rod holder for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 5 is a side elevation view of the present fishing rod holder, with the base and rod holder portions concentrically aligned with one another.

FIG. 6 is a side elevation view similar to FIG. 5, but showing the rod holder portion hinged rearwardly to an intermediate and frictionally locked position.

FIG. 7 is a side elevation view similar to FIG. 6, but showing the rod holder portion hinged further rearwardly to the hinge limit.

Similar reference characters denote corresponding features consistently throughout the several figures of the attached drawings.

DETAILED DESCRIPTION OF THE PREFERRED EMBODIMENT

Figure 1:
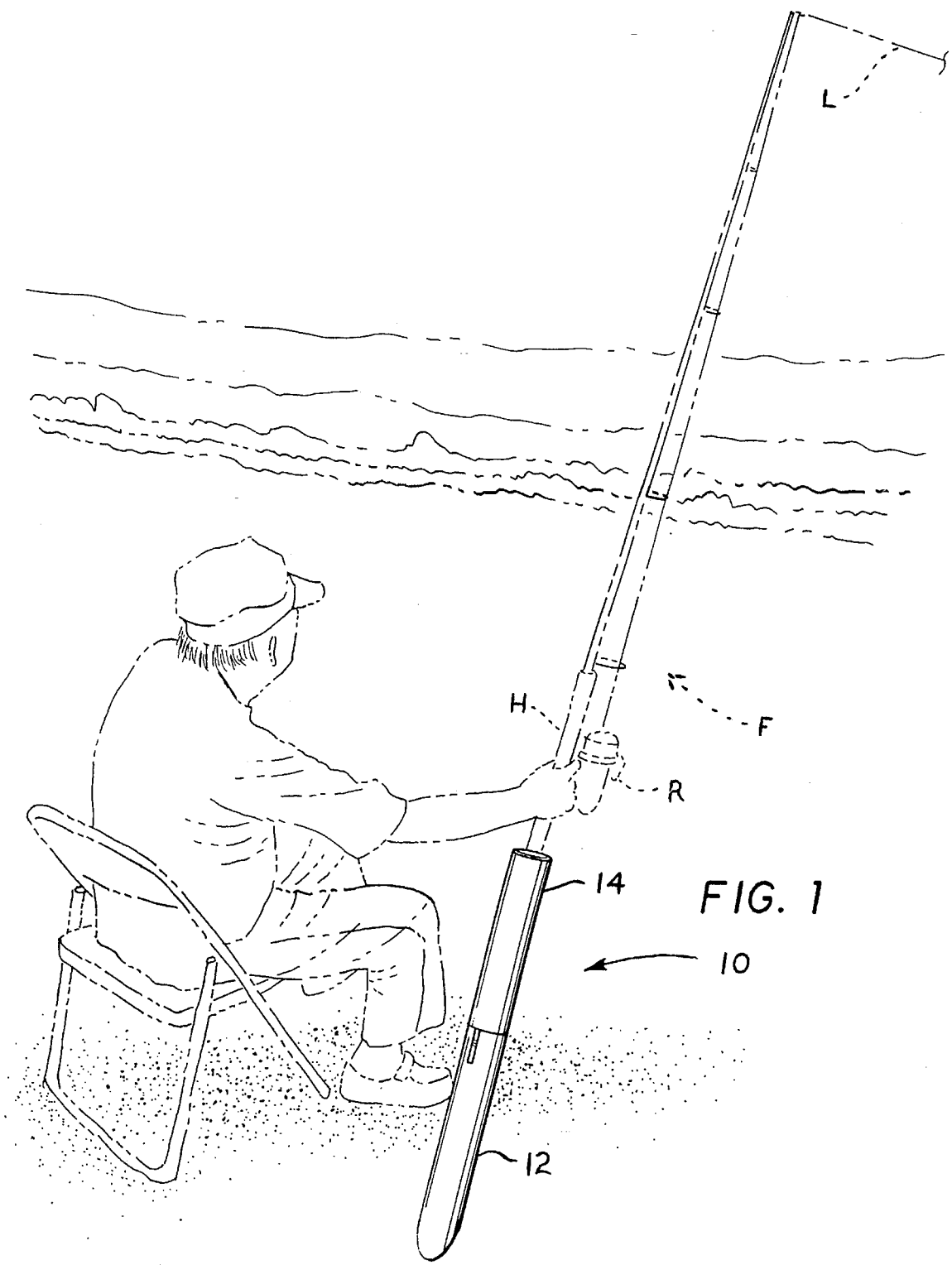
FIG. 1 is an environmental perspective view of the present hinged fishing rod holder in use, with the two portions in an aligned position to place the rod in a fishing position.
Figure 2:
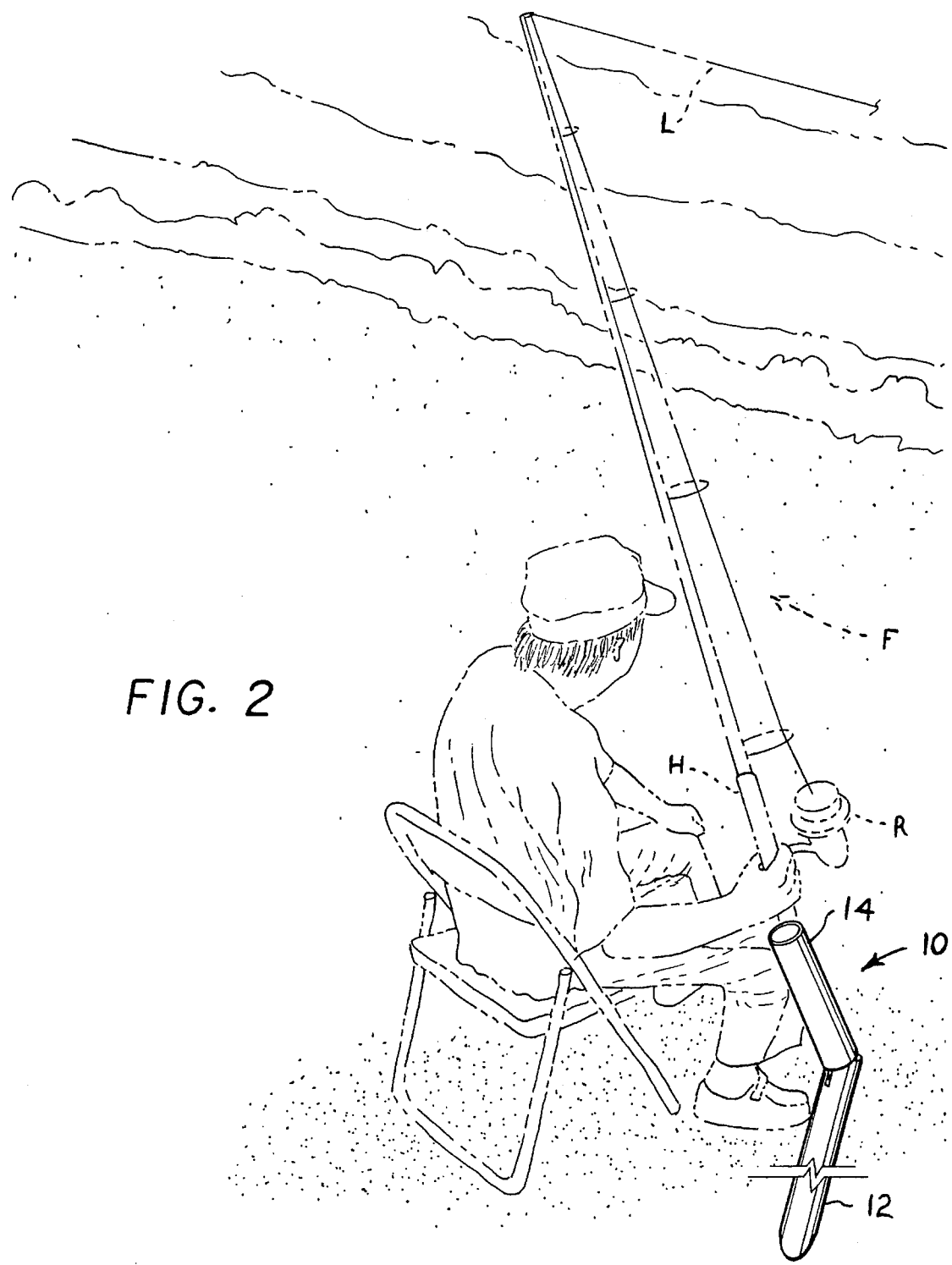
FIG. 2 is an environmental perspective view similar to FIG. 1, but showing the rod holder portion rearwardly hinged from the base portion to allow convenient withdrawal of the rod.

Referring now particularly to FIGS. 1 and 2 of the drawings, the present invention will be seen to relate to a hinged fishing rod holder 10, adapted for the holding of a fishing rod F in a fishing position with the rod holder components in a concentric extended position (FIG. 1), or for the manipulation and/or removal of the rod F therefrom when the rod holder portion of the rod holder is hinged rearwardly to a folded position (FIG. 2).

The rod holder 10 includes a first or base portion 12 and an opposite second or rod holder portion 14, hingedly attached to one another. Preferably, the two portions 12 and 14 are formed of hollow cylindrical tubular material, but other configurations may be used as desired (square section tubing, or even solid rod, angle iron, T-section, etc., if the hinge assembly is configured to attach to such configurations). Polyvinyl chloride (pvc) pipe or tubing has been found to work well for the first and second portions 12 and 14 of the rod holder 10, due to its economical cost, durability, light weight, and resistance to corrosion, but other plastics or even metal (e.g., aluminum, etc.) may be used if desired.

Figure 3:
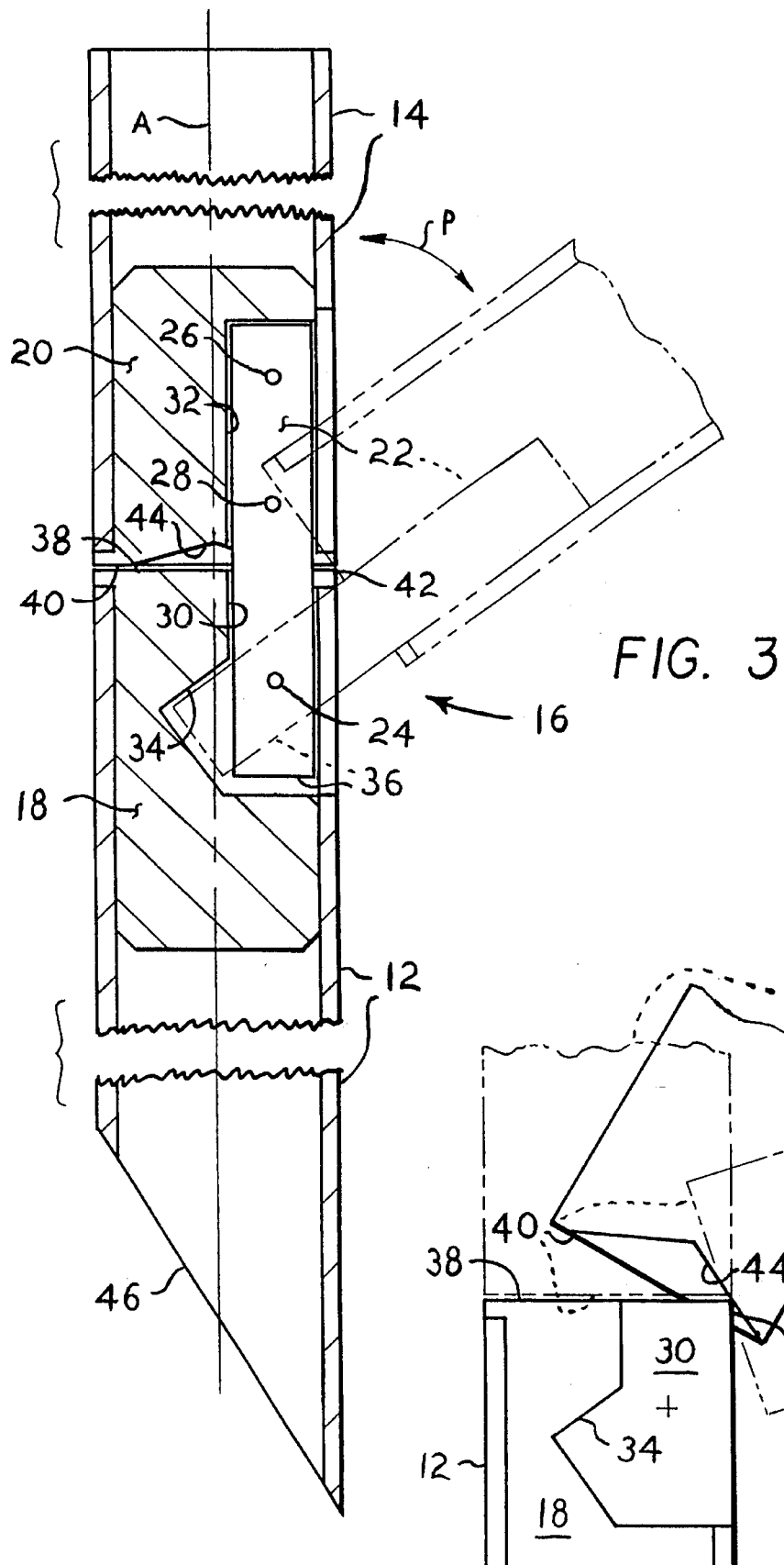
FIG. 3 is a broken elevation view of the present fishing rod holder in section, showing structural and operating details of the hinge mechanism.
Figure 4:
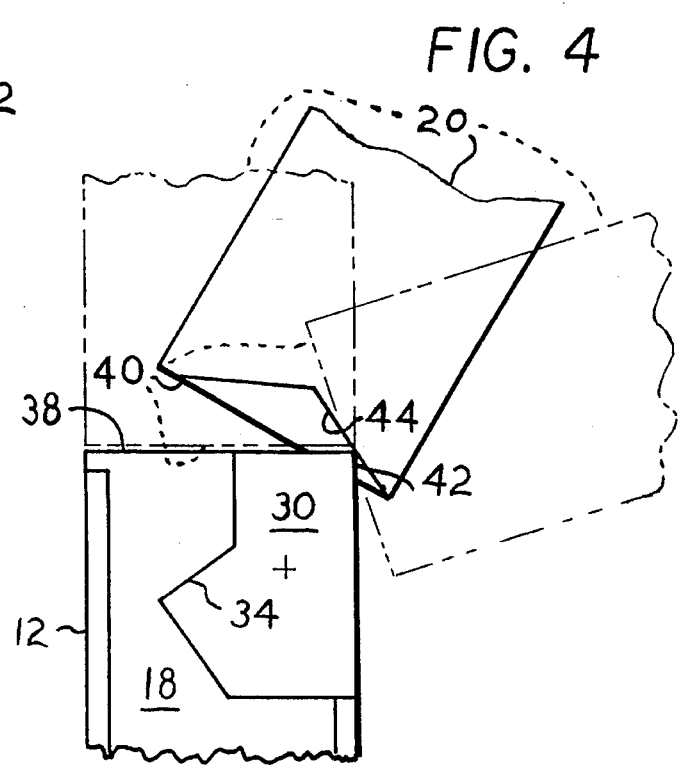
FIG. 4 is a schematic elevation view of the hinge portion of the present fishing rod holder, showing the intermediate interference provided within the hinge portion to hold the base and rod holder portions at an intermediate angle relative to one another.

FIGS. 3 and 4 provide detailed views of the structure and operation of the hinge assembly 16. The hinge assembly 16 is formed of a first plug 18 and a second plug 20, each adapted to secure respectively to the first portion 12 and second portion 14 of the rod holder 10. With the tubular configuration of the first and second portions 12 and 14, the plugs 18 and 20 are preferably cylindrically shaped, and have diameters adapted for a tight interference fit within the adjacent hollow interior ends of the two portions 12 and 14. Other plug configurations may be provided to attach to corresponding shapes or configurations of the first and second portions 12 and 14, as desired. Depending upon the materials of which the portions 12 and 14 are formed (particularly metals), it may be desirable to thread the plugs 18 and/or 20, and the corresponding portions 12 and/or 14, so the plugs may be threadedly secured into the adjacent ends of the portions 12 and/or 14. Other attachment means may be provided as desired, and/or depending upon the configuration of the components.

The two plugs 18/20 are also preferably formed of a plastic material for economy, durability, light weight, corrosion resistance, and ease of manufacture. Nylon (tm) has been found to work well, and provides the required strength for such an assembly 16. Other materials, including metals, may be used as desired.

An axially offset hinge strap 22 connects the two plugs 18/20 together, with the hinge strap 22 being pivotally secured to the first plug 18 by a single pin 24 which passes laterally through the strap 22 and one side of the plug 18, offset from the central axis A of the hinge assembly (and portions 12/14). The opposite end of the strap 22 is immovably secured within the second plug 20, by two pins 26 and 28 which pass through the strap 22 and also through the second plug 20. The two pins 26/28 are also offset from the axis A of the assembly 16, the same distance from the axis A as the hinge pivot pin 24. The hinge strap 22 and pins 24/26/28 are preferably formed of stainless steel for durability and corrosion resistance, but other materials may be substituted as desired.

The two plugs 18/20 respectively include slots 30/32 to provide clearance for the hinge strap 22 installed therein. The second plug slot 32 need only be sufficiently deep to provide clearance for the strap 22 as it is immovably affixed therein by the two pins 26/28, but the first plug slot 30 includes a relatively deeper extension 34 having predetermined angular depth adapted to engage an extension 36 of the pivoting end of the hinge strap 22. By adjusting the angular depth of the slot extension 34, the folding angle of the two plugs 18/20, and thus the first and second portions 12/14 secured thereto, may be set as desired. Preferably, a pivot angle P of 60 degrees is provided, but greater or lesser pivot angles may be provided as desired.

The above described arrangement comprises a second or folding stop, serving to limit the folding angle of the two hinge components 18/20 to a predetermined degree. A first or extension stop is provided by the abutting faces 38/40 respectively of the two plugs 18/20, which engage or contact one another when the two hinge components 18/20 (and first and second portions 12 and 14) are substantially concentrically aligned. Thus, the folding angle of the present fishing rod holder 10 is defined by the limits of the first and second stops described above.

The above described construction allows the two hinge components 18/20, and attached first and second portions 12/14, to move or hinge relatively freely between the two stops. However, further convenience may be provided by means of a generally intermediate frictional stop or locking means between the extended and folded stops described above, as shown in FIG. 4. Due to the offset of the hinge strap 22, the portion of the second plug face 40 which is between a line formed by the hinge strap pins 24/26/28 and the central axis A, will move both outwardly and toward the adjacent first plug 18. With the close tolerances provided by the adjacent faces 38/40 to serve as an extension stop for the present fishing rod holder 10, it will be seen that at least some interference will occur between the second plug face 40 and the adjacent periphery 42 of the first plug face 38 adjacent the hinge strap 22. The amount of interference, and thus the force required to overcome such interference, may be adjusted by providing a concave undercut 44 within the face 40 of the second plug 20. The undercut 44 is carefully formed to provide clearance to either side of a central position, but to frictionally engage the first plug periphery 42 to provide an intermediate frictional stop.

FIGS. 5 through 7 provide views of the present hinged fishing rod holder 10 and fishing rod F. The present holder 10 is removably inserted or anchored into the sand or other underlying surface S, by means of the first or base portion 12. Preferably, the holder 10 is inserted at approximately a thirty degree angle from the vertical (or as desired) toward the water, with the hinge strap side positioned on the upwardly disposed side of the holder 10, as shown. Thus, when the fishing rod F is installed within the second or rod holder portion 14 of the holder 10 with the two portions 12 and 14 substantially aligned, as shown in FIG. 5, it will be angled toward the water in a fishing position, awaiting a strike from a fish, as further shown in FIG. 1. The base portion 12 may be provided with an angularly truncated distal end 46 (more clearly shown in FIG. 3), providing for greater ease of penetration into a penetrable surface (sand, etc.). Alternatively, the base portion 12 may be provided with a fitting adapted for insertion into an oar lock of a boat, or other means of attachment to another article or structure as desired.

When a strike occurs, or when the angler wishes to reel in the line L, he/she need only grasp the handle H of the fishing rod F, as shown in FIG. 1, and pull the rod F to a substantially vertical position, as shown in FIG. 6. This provides at least three benefits: First, a relatively short but brisk pull will serve to set the hook in the striking fish; secondly, it positions the reel R of the fishing rod F closer to the angler to facilitate reeling in the fish (or line, as the case may be); and third, once the fish (and/or line L) has been reeled in, the line L is positioned substantially vertically, where the bait B or lure (and any fish thereon) is positioned within easy reach of the angler.

The intermediate frictional locking means described further above and shown in FIG. 4, serves to retain the rod holder portion 14 of the present fishing rod holder 10 in a substantially vertical position (assuming the base portion 12 has been positioned at approximately the proper angle) for such operations, as shown in FIG. 6 of the drawings.

When the angler wishes to cast the line out for further fishing, he/she need merely pull the upper portion 14 of the present hinged fishing rod holder 10 further back, to angle the fishing rod F toward the angler. The rod F may then be easily withdrawn, by lifting and withdrawing the butt or handle H of the fishing rod F toward the angler, as shown in FIGS. 2 and 7. Thus, the angler need not reach or extend oneself forwardly in order to remove the fishing rod F from the present rod holder 10, as is required in conventional rod holders. This provides greatly needed convenience for disabled persons and/or those who may be confined to a wheelchair, or for whatever reason lack the mobility required for ease of manipulation of conventional rod holders.

In summary, the present hinged fishing rod holder 10 will be seen to greatly facilitate the operations and procedures involved in fishing, particularly from the shore. The hinged feature allows the fishing rod to be positioned at the proper angle for fishing, yet provides for convenient setting of the hook and reeling in of a fish when a strike occurs, by the intermediate frictional locking or retaining means. Finally, further rearward drawing of the fishing rod and rod holder portion, positions the rod for easy removal from the rod holder, for casting for further fishing or for storage when fishing is completed for the day.

It is to be understood that the present invention is not limited to the sole embodiment described above, but encompasses any and all embodiments within the scope of the following claims.

I claim:

1. A hinged fishing rod holder, comprising:
   an elongate first portion comprising an elongate tubular member;
   an oppositely disposed elongate second portion comprising an elongate tubular member; and,
   a hinge assembly joining said first portion with said second portion, said hinge assembly comprising,
      a first portion plug securable within said first portion, said first portion plug including a first slot,
      a second portion plug securable within said second portion, said second portion plug including a second slot alignable with said first slot, and a hinge strap pivotally secured in said first slot and immovably secured in said second slot such that said second portion is axially pivotable with respect to said first portion, said first slot and said second slot engaging said hinge strap and defining a first stop position and a second stop position, wherein said second portion and said first portion are aligned in the first stop position and said second portion is at a predetermined angle relative to said first portion in the second stop position.

2. The hinged fishing rod holder of claim 1, wherein:

said first portion plug includes a first face and said second portion plug includes a second face abutable with said first face upon axial alignment of first portion plug and said second portion plug, thereby preventing rotation of said second portion beyond said first stop position, and said first slot having a chamber of increased depth accepting an extension of said hinge strap therein to limit arcuate movement of said second portion past said second stop position.

3. The hinged fishing rod holder of claim 2, wherein:

said hinge assembly includes frictional locking means for an intermediate position between said first stop position and said second stop position.

4. The hinged fishing rod holder of claim 3, wherein:

said first portion plug includes a periphery adjacent said hinge strap, and said frictional locking means comprises a concave undercut formed within said second face, said undercut having a predetermined depth adapted to frictionally engage said periphery of said first portion plug at an intermediate position between said first stop position and said second stop position.

5. The hinged fishing rod holder of claim 1, wherein:

said first portion comprises an elongate hollow tube having an angularly truncated distal end adapted for removable insertion into an underlying surface.

6. The hinged fishing rod holder of claim 1, wherein:

said first portion and said second portion each comprise an elongate hollow tube formed of a plastic material.

7. The hinged fishing rod holder of claim 6, wherein:

said plastic material is polyvinyl chloride.

8. The hinged fishing rod holder of claim 1, wherein:

said hinge assembly includes a first portion plug and a second portion plug, each formed of a plastic material.

9. The hinged fishing rod holder of claim 8, wherein:

said plastic material is Nylon.

10. The hinged fishing rod holder of claim 1, wherein:

said hinge strap is secured to said first portion plug and said second portion plug with a plurality of hinge pins, with said hinge strap and said hinge pins being formed of stainless steel material.

* * * * *